United States Patent [19]
Rose, Jr. et al.

[11] 3,771,314
[45] Nov. 13, 1973

[54] GAS TURBINE ENGINE EMERGENCY SPEED CONTROL SYSTEM

[75] Inventors: William W. Rose, Jr.; Walter D. Hutto, Jr., both of Cincinnati, Ohio

[73] Assignee: General Electric Company, Cincinnati, Ohio

[22] Filed: Oct. 4, 1971

[21] Appl. No.: 185,964

[52] U.S. Cl. .................. 60/223, 60/235, 60/39.28
[51] Int. Cl. .............................................. F02k 1/12
[58] Field of Search .................... 60/223, 235, 243, 60/261, 241, 39.28

[56] References Cited
UNITED STATES PATENTS

| | | | |
|---|---|---|---|
| 3,060,683 | 10/1962 | O'Neill............................ | 60/223 X |
| 3,080,709 | 3/1963 | Rand................................ | 60/223 X |
| 2,818,703 | 1/1958 | Victor.............................. | 60/235 |
| 3,360,050 | 12/1967 | Sibley............................. | 416/27 |
| 3,105,354 | 10/1963 | McCombs...................... | 60/39.16 R |
| 3,374,622 | 3/1968 | Yates............................. | 60/39.28 R |
| 3,439,496 | 4/1969 | Bevers........................... | 60/39.28 R |
| 3,653,206 | 4/1972 | Greune.......................... | 60/39.28 R |

*Primary Examiner*—Clarence R. Gordon
*Attorney*—Derek P. Lawrence et al.

[57] ABSTRACT

A control system for an aircraft gas turbine engine is shown to include emergency provisions for overriding the throttle position and discontinuing afterburner operation while setting engine speed at some preselected value. Two solenoid valves are included in the control system, one to deliver a servo signal to an "rpm lockup" device in the main fuel control and the other to interrupt a control signal to the afterburner fuel valve.

5 Claims, 3 Drawing Figures

INVENTORS.
WILLIAM W. ROSE, JR.
WALTER D. HUTTO, JR.
BY
T. J. Bird, Jr.
AGENT

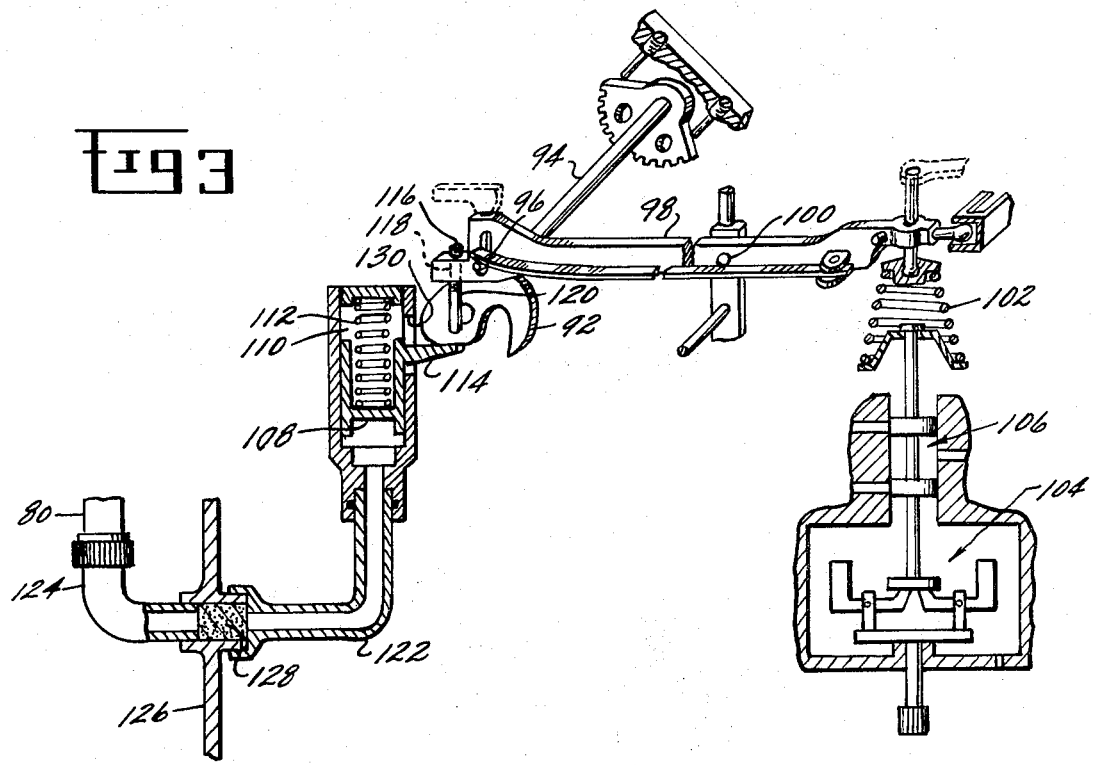

GAS TURBINE ENGINE EMERGENCY SPEED CONTROL SYSTEM

BACKGROUND OF THE INVENTION

This invention relates generally to aircraft gas turbine engine control systems and, more particularly, to a control system which enables a pilot to set engine speed at a certain level in the event normal control is lost due to engine or aircraft throttle system failure.

One basic type of gas turbine engine, commonly referred to as a turbojet or jet engine, employs an axial flow compressor which discharges pressurized air to a combustor where fuel is burned to generate a high energy hot gas stream. This gas stream then passes through and drives a turbine which in turn rotates the rotor of the compressor. The remaining energy of the hot gas stream may then be converted to a propulsive force by discharging the gas stream through an exhaust nozzle, which normally is of the variable area type. A second basic type of engine employs the same combination of compressor, combustor and turbine as a "core engine." The hot gas stream, however, drives a second turbine which in turn powers a so-called fan or low pressure compressor to pressurize an additional air stream which is also discharged through the exhaust nozzle to provide a propulsive force. This latter type of engine is commonly referred to as a turbofan engine.

In both turbofan and turbojet engines, fuel may be burned in the gas or air stream downstream of the turbine and prior to being discharged from the exhaust nozzle to provide additional propulsive force from what is referred to as an afterburner or augmented operation.

Normal operation of the gas turbine engine is generally controlled by a pilot-actuated control lever which, through the engine control system, indirectly sets the rate of fuel flow to the combustor and/or to the afterburner of the engine. This determines the combustion rate and the energy level of the hot gas stream and yields a demanded thrust or energy output from the engine. By controlling the rate of fuel flow to the engine, the pilot-actuated control lever also sets the engine rotational speed which partially determines the amount of air delivered to the combustion systems.

As the control lever is moved and fuel is increased, an increase in pressure occurs at certain locations within the engine. This increase in pressure as a result of increased fuel flow will, if allowed to continue, cause an aerodynamic stall or surge within the compressor (or fan). In order to preclude this stall, the jet nozzle area must be opened. The pilot-actuated control lever, through a nozzle area control, also controls the exhaust nozzle area. Thus, the position of the pilot controlled throttle sets at least three parameters of the engine, namely, engine speed, fuel flow, and exhaust nozzle area position.

Typical throttle power settings for present day military aircraft might include idle, military, minimum afterburner, and maximum afterburner; while typical settings for present commercial aircraft might include idle, cruise, takeoff, and possibly afterburner. In normal installations, aircraft throttle movement is transmitted by an aircraft throttle linkage and cable system to the engine control system. Failure of any part of the linkage or cable system may result in loss of pilot throttle control over the engine.

It is therefore desirable to provide an emergency control system whereby pilot selection of a certain engine speed is permitted, in the event of such a failure, thereby providing adequate thrust for return to an appropriate landing site. It is also desirable that the emergency control system have the following capabilities: (1) during normal operation the emergency system should in no way interfere with or alter standard pilot procedure of achieving desired engine speeds; (2) the emergency control system, when selected, should set a predetermined engine speed regardless of throttle position; and (3) in the event the engine is in afterburner operation when aircraft throttle connection is lost, the emergency system should include provision for discontinuing afterburner operation.

SUMMARY OF THE INVENTION

It is an object of the present invention, therefore, to provide an emergency engine speed control system for a gas turbine engine having the above described capabilities.

Briefly stated, the above and other related objects are attained by providing a control system in which actuation of a manually controlled pilot switch causes a solenoid valve to deliver servo fuel to an rpm lockup device provided in a main fuel control. The rpm lockup device, when actuated, overrides an engine speed control lever arm, which is normally positioned in response to throttle movement, and causes the speed control lever to be set at a predetermined location. Actuation of the manually controlled switch further operates an afterburner cutout solenoid valve which bypasses an afterburner fuel signal from the main fuel control to an afterburner fuel pump, thereby causing the afterburner fuel pump to be inactivated.

DESCRIPTION OF THE DRAWINGS

While the specification concludes with a series of claims which pg,5 distinctly claim and particularly point out the subject matter which Applicants regard as their invention, an understanding of the invention will be gained from the following detailed description, which is given in light of the accompanying drawings, in which:

FIG. 3 is a schematic of a portion of a main fuel control showing a preferred way of mechanizing the present invention.

DESCRIPTION OF A PREFERRED EMBODIMENT

Figure 1:
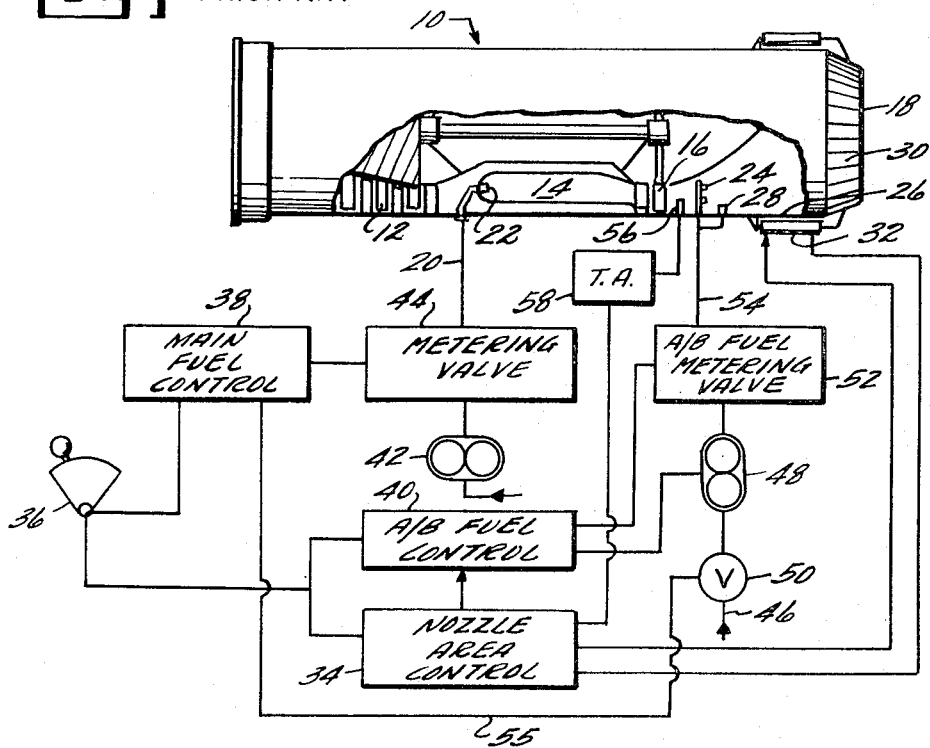
FIG. 1 is a system schematic of a prior art fuel control system.

Referring now to the drawings wherein like numerals correspond to like elements throughout, reference is initially directed to FIG. 1 wherein an aircraft turbojet engine including an afterburner and a variable area nozzle is designated generally by reference numeral 10. As there shown, the engine 10 comprises a compressor 12 providing high pressure combustion air to a combustion zone 14, the combustion gases from which discharge through a turbine 16 to drive the compressor and thereafter exhaust through a variable area exhaust nozzle 18 to provide propulsive thrust. Fuel is supplied to the engine main combustion system through a line 20 connected to supply fuel to nozzle elements 22, a plurality of which are arranged to inject fuel into the combustion zone 14.

The engine 10 is further equipped with an afterburner fuel manifold as shown at 24 arranged to inject a spray of fuel into an engine tailpipe 26 located downstream of the turbine 16. Supplementary fuel provided by the afterburner fuel manifold 24 is ignited by means of an igniter 28 to provide thrust augmentation during periods when maximum thrust output is required, as for example, during takeoff.

With an engine thus equipped for afterburning operation, controlled variation of the engine nozzle exit area is desirable in order to obtain efficient operation under the widely varying conditions which exist during afterburning and non-afterburning or "dry" operation. To this end, the exhaust nozzle 18 of the engine 10 is provided with means, such as flap elements 30, for varying the effective exit area of the nozzle. Such nozzle area varying means are well known in the art and require no discussion except to note that movement of the flap elements 30 is by operation of one or more actuators 32 connected to drive the nozzle in opening and closing directions in accordance with the control input signal from a nozzle area control 34.

Preferably, though not necessarily, a single throttle lever 36 is provided to control operation of the entire engine, including control of the main fuel supply as well as of afterburner fuel supply and nozzle area position. The single throttle lever 36 is illustrated in FIG. 1 linked to an engine main fuel control 38 for metering fuel to the nozzle elements 22, and is shown linked to an afterburner fuel control 40 and the nozzle area control 34 for controlling both the supply of afterburner fuel and operation of the nozzle actuators 32.

The main fuel system includes a pump 42 which has its inlet connected to the aircraft fuel tanks and discharges through a metering valve 44 operated to control the rate of fuel flow to the engine combustion chamber 14. The metering valve 44 is under control of the main fuel control 38, and this in turn is controlled by the throttle lever 36 as previously mentioned. As will be described in greater detail, the main fuel control 38 also includes engine speed responsive means operative to hold engine speed constant at a speed setting scheduled by the position of the throttle lever 36.

The afterburner fuel supply system includes a supply line 46 connecting to the inlet of a pump 48 through a shutoff valve 50. The pump 48 is connected to discharge through a metering valve assembly 52 into a line 54 connecting to the engine afterburner manifold 24. Operation of the shutoff valve 50 is controlled by the main fuel control as shown by line 55, while the metering valve 52 operates under control of the afterburner fuel control 40 in response to the various inputs to that unit, such as the throttle lever input previously mentioned. As further shown in FIG. 1, a turbine temperature signal is provided by a thermocouple of thermocouples 56 mounted in the engine tailpipe just downstream of the turbine 16. This turbine temperature signal is amplified by temperature amplifier 58 before transmission to the nozzle area control 34. Finally, a nozzle position signal is supplied to the nozzle area control 34 from the nozzle actuators 32 and indicates the actual position of the nozzle.

Figure 2:
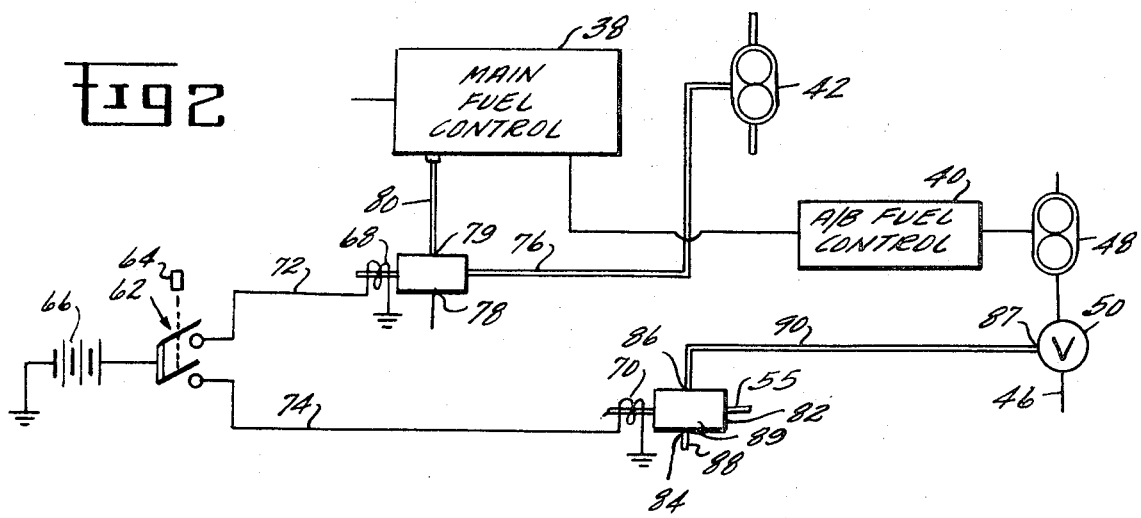
FIG. 2 is a system schematic of a fuel control system incorporating the emergency speed control system of the present invention.

Referring now to FIGS. 2 and 3, the inventive emergency control system, which enables the pilot to set engine speed at a predetermined level and to interrupt afterburner operation in the event that linkage between the throttle lever 36 and any portion of the engine control system fails for some reason, will now be described. As shown, the control system includes a switch 62, which would be controlled by means of an actuator 64 located in the aircraft cockpit. The switch 62 connects a suitable power source 66 to an rpm lockup solenoid valve 68 and an afterburner cutout solenoid valve 70 by means of a pair of conductors 72 and 74, respectively.

The rpm lockup solenoid valve 68 is a three-way, two-position valve which is supplied with suitable servo fluid, such as engine fuel, by means of a line 76 connected to the engine fuel supply system. A first outlet 78 of the servo valve 68 is connected to drain, while outlet 79 is connected to a line 80 to provide an input signal to an rpm lockup device, which, ideally, comprises a part of the main fuel control 38. The rpm lockup device will be described in greater detail later in connection with FIG. 3.

The afterburner cutout solenoid valve 70 is also a three-way, two-position valve which may be identical in structure to the solenoid valve 68. The afterburner cutout solenoid valve 70 is positioned within the signal line 55 between the main fuel control 38 and the afterburner shutoff valve 50. The valve 70 permits afterburner signal fuel to pass uninterrupted through the line 55 during normal operation but vents the signal fuel overboard during emergency operation. For this reason, an inlet 82 of the valve 70 is connected to the line 55, while outlets 84 and 86 are connected to drain and to a signal input port 87 of the afterburner shutoff valve 50 by means of lines 88 and 90, respectively.

Referring now to FIG. 3, a portion of the main fuel control 38 is shown in greater detail to include a throttle cam 92 which is connected to the throttle lever 36 (FIG. 1) by means of a shaft 94 which rotates in response to movement of the throttle lever 36 due to suitable mechanical connections (not shown). The cam 92 has associated therewith a cam follower 96 which forms a portion of a speed setting lever 98. The speed setting lever 98 pivots about a pivot point 100 to compress a spring 102 which forms a portion of a speed governor 104. The detailed operation of the governor 104 forms no portion of the present invention, and the governor 104 could take many shapes known to those skilled in the art. For this reason, the governor 104 is shown in phantom in FIG. 3. It is sufficient for a complete understanding of the present invention to state that compression of the spring 102 causes an increase in engine speed, with the actual engine speed being a function of the amount of compression of the spring 102. The governor 104 then provides fuel flow to the engine as required to achieve the selected engine speed. Achievement of the selected speed nulls out a pilot valve 106, which forms a portion of the governor 104, thus completing the governor servo loop within the main fuel control 38.

As further shown in FIG. 3, the main fuel control 38 includes a hollow piston 108 which is positioned for movement within a chamber 110 formed internally of the main fuel control 38. The piston 108 is biased to a preselected position by means of a spring 112 positioned within the chamber 110. The piston 108 includes an arm 114 which projects outside of the chamber 110 and which moves with piston 108.

Referring still to FIG. 3, the left end of the lever 98 includes an extension 116 which includes a hole 118 passing therethrough. The hole 118 is internally threaded to receive a screw 120 which, when positioned within the hole 118, projects downwardly from the extension 116. The amount that the screw 120 projects can be selected by controlling the number of turns imparted to the screw 120 in assembly.

The piston chamber 110 is supplied with a suitable hydraulic servo fluid through tubing 122 by means of an external fitting 124 which extends through casing 126 of the main fuel control 38. If necessary, the tubing 122 may be supplied with a suitable filter 128.

As further shown in FIG. 3, when sufficient servo fluid is supplied to the chamber 110 to overcome the force of the spring 112, the piston 108 and its corresponding arm 114 will move upwardly. At some point in its travel, the arm 114 will engage the screw 120 and cause clockwise rotation of the lever 98 about the pivot point 100. Movement of the piston 108, and likewise movement of the lever 98, will continue until the arm 114 abuts a prepositioned stop 130, which may be formed within the chamber 110. The piston stop 130 is preset to displace the speed setting lever 98 so that the governor speeder spring 102 is compressed to the desired speed position. The governor then acts through its normal function to provide the exact quantity of fuel to achieve and maintain the desired speed associated with the adjustable preset stop position.

In the construction shown in FIG. 3, if the speed selected by the position of the throttle 36 is in excess of the speed associated with the preset stop 130, the rpm lockup device will have no effect on engine speed except to provide a minimum speed "floor" below which speed will not decelerate upon throttle retard. If the throttle selected speed is less than that associated with the preset stop 130, the rpm lockup device will, when actuated, provide the desired "lockup" speed.

Referring now to FIGS. 2 and 3, the operation of the emergency speed control system will be described with an initial assumption being made that engine is in afterburner operation. Upon pulling back the throttle 36 to the non-afterburner position, the pilot would obtain no response from the engine. At this time, the pilot would operate the actuator 64 within the cockpit thereby closing the switch 62 and providing an electrical signal to the solenoid valves 68 and 70. The solenoid valve 68 would then supply servo fuel to the fitting 124 of the main fuel control 38 via the conduit 80. This servo fuel would cause movement of the piston 108 to its preset stop 130, thereby causing rotation of the lever 98 and compression of the spring 102 of the speed governor 104 as described above. The governor 104 then acts through its normal function to provide the exact quantity of fuel to achieve and maintain the desired speed associated with the adjustable preset stop position of the piston 108.

Simultaneously with the closing of the solenoid valve 68, the solenoid valve 70 closes, thereby interrupting the fuel signal from the main fuel control 38 which opens the afterburner fuel pump shutoff valve 50. This action discontinues afterburner operation and the net effect of the emergency speed control is to set engine operation at a preselected, non-afterburner speed.

While a preferred embodiment of the invention has been described, it will be obvious that certain changes could be made without departing from the broader aspects of the invention. For example, the single throw, double pole switch 62 could be replaced by a pair of single throw, single pole switches, which would give the pilot the added capability of being able to set the engine speed and cut out the afterburner at different times. It should also be apparent that the servo valves could be placed at different locations in the control system and still perform the same basic function. The appended claims are intended to cover these and similar changes.

What we claim is:

1. In a gas turbine engine control system of the type including a pilot actuated throttle which controls engine speed, engine fuel flow, exhaust nozzle area and afterburner operation, the improvement comprising:
    an emergency control system which includes means for overriding the throttle position and for setting engine speed at a preselected value while discontinuing afterburner operation, said emergency control system having no effect on normal operation of the throttle actuated control system when inactivated including a first solenoid valve, actuation of which causes engine speed to be set at a preselected value and a second solenoid valve, actuation of which discontinues afterburner operation.

2. In a gas turbine engine control system of the type including a pilot actuated throttle which controls engine speed, engine fuel flow, and exhaust nozzle area, the improvement comprising:
    an emergency control system including means for overriding the throttle position and for setting engine speed at a preselected value, said emergency system having no effect on normal operation of the throttle actuated control system when inactivated and said emergency control system being characterized in that engine fuel flow and engine speed are controlled by fuel control means and said fuel control means include a speed governor which delivers a desired amount of fuel to maintain a certain engine speed, and said emergency control system includes a first solenoid valve, which when actuated causes servo fluid to be delivered to an rpm lockup device, which forms a portion of said fuel control means and which operates on said speed governor to maintain said governor at a level which provides said preselected engine speed.

3. The improved control system of claim 2, wherein said rpm lockup device includes a piston, means for biasing said piston to a first inoperative position, and means for supplying servo fluid to said piston upon actuation of said first solenoid valve whereupon said piston assumes a second operative position, said piston when in said operative position acting upon said speed governor to maintain said governor at or above a preselected level which will provide a minimum engine speed.

4. The improved control system of claim 3 wherein said throttle also controls afterburner operation and said emergency system further includes a second solenoid valve, actuation of which overrides the throttle position and discontinues afterburner operation.

5. The improved control system of claim 4 wherein said second solenoid valve, when actuated, interrupts a servo fluid signal provided by said fuel control to an afterburner fuel valve.

* * * * *